(12) United States Patent
Baudasse et al.

(10) Patent No.: US 9,309,011 B2
(45) Date of Patent: Apr. 12, 2016

(54) ADAPTED TORQUE MOTORISATION SYSTEM FOR DEPLOYABLE SPATIAL STRUCTURES

(75) Inventors: Yannick Baudasse, Grasse (FR); Stéphane Vezain, Mandelieu (FR)

(73) Assignee: THALES, Neuilly sur Seine (FR)

( * ) Notice: Subject to any disclaimer, the term of this patent is extended or adjusted under 35 U.S.C. 154(b) by 498 days.

(21) Appl. No.: 13/312,779

(22) Filed: Dec. 6, 2011

(65) Prior Publication Data

US 2012/0137801 A1 Jun. 7, 2012

(30) Foreign Application Priority Data

Dec. 7, 2010 (FR) ...................................... 10 04765

(51) Int. Cl.
*B64G 1/22* (2006.01)
*E05D 3/06* (2006.01)

(52) U.S. Cl.
CPC .................. *B64G 1/222* (2013.01); *E05D 3/06* (2013.01); *Y10T 74/18792* (2015.01)

(58) Field of Classification Search
CPC .......... B64G 1/222; E05D 3/06; E05D 11/06; E05D 3/00
USPC ........... 16/293, 294, 295, 302, 305, 308, 311, 16/373, 278, 281, 285, 286, 282; 244/172.6; 74/89
See application file for complete search history.

(56) References Cited

U.S. PATENT DOCUMENTS

| | | | | |
|---|---|---|---|---|
| 1,220,084 A * | 3/1917 | Francksen | ....................... | 16/282 |
| 3,092,870 A * | 6/1963 | Baer | ............................ | 16/277 |
| 3,945,053 A * | 3/1976 | Hillberry et al. | ........... | 623/20.24 |
| 4,428,095 A * | 1/1984 | Takahashi | ...................... | 16/297 |
| 4,558,911 A * | 12/1985 | Ruoff | ............................. | 439/13 |
| 4,765,027 A * | 8/1988 | Andric | ............................ | 16/354 |
| 5,062,181 A * | 11/1991 | Bobrowski et al. | ............. | 16/354 |
| 5,086,541 A * | 2/1992 | Auternaud et al. | ............. | 16/227 |
| 5,146,803 A * | 9/1992 | Chew et al. | ...................... | 74/437 |
| 5,405,408 A * | 4/1995 | Pitkin | ............................. | 623/44 |
| 6,505,381 B1* | 1/2003 | Thomson et al. | ............... | 16/302 |
| 7,513,461 B2* | 4/2009 | Reutenauer et al. | ........ | 244/172.6 |
| 7,832,056 B2* | 11/2010 | Kuwajima et al. | .............. | 16/354 |

(Continued)

FOREIGN PATENT DOCUMENTS

| | | | | |
|---|---|---|---|---|
| FR | | 2635077 A1 | 2/1990 | |
| FR | | 2902763 A1 | 12/2007 | |
| WO | WO 2007147859 A1 * | | 12/2007 | ............... B64G 1/22 |

*Primary Examiner* — Emily Morgan
(74) *Attorney, Agent, or Firm* — Baker and Hostetler LLP

(57) ABSTRACT

A motorization device comprises two substantially parallel winding cylinders, and at least one longitudinal linking element able to maintain a predetermined distance between the winding cylinders and wound around winding tracks, the linking element consequently having a crossing point located between the winding cylinders. The motorization device includes two flexible tracks, fixed on each of the winding cylinders and arranged to face and to touch eachother at the contact point, a pre-stressing force being applied to the contact point under the effect of said linking element. The flexible tracks are spiral shaped and arranged such that the contact point between the two spiral-shaped flexible tracks, located between the winding cylinders, is offset relative to the crossing point of the linking element, such that a torque dependent on the distance between the contact point and the crossing point is applied to the contact point, causing reciprocal rotation of the flexible tracks.

11 Claims, 6 Drawing Sheets

(56) References Cited

U.S. PATENT DOCUMENTS

| | | | |
|---|---|---|---|
| 8,151,414 B2 * | 4/2012 | Baudasse et al. | 16/227 |
| 8,992,108 B2 * | 3/2015 | Baudasse et al. | 403/119 |
| 2009/0282646 A1 | 11/2009 | Baudasse et al. | |
| 2014/0116165 A1 * | 5/2014 | Baudasse et al. | 74/89 |
| 2014/0117164 A1 * | 5/2014 | Baudasse et al. | 244/172.6 |

* cited by examiner

ADAPTED TORQUE MOTORISATION SYSTEM FOR DEPLOYABLE SPATIAL STRUCTURES

CROSS-REFERENCE TO RELATED APPLICATION

This application claims priority to foreign French patent application No. FR 1004765, filed on Dec. 7, 2010, the disclosure of which is incorporated by reference in its entirety.

FIELD OF THE INVENTION

The present invention relates to the field of mechanisms for deploying spatial appendices, such as antennas or solar generators.

These mechanisms comprise hinge lines generally using torsion-spring, spiral-spring or Carpentier-joint motorization components, making it possible to counteract resistive torque and ensure the margins required in terms of torque generated to ensure the full deployment of the appendices.

BACKGROUND

In this context, known motorization components provide scalable or variable motorization torque, which causes over-motorization and impacts on full deployment.

These impacts may be significant and cause damage to the spatial appendices on full deployment, as well as parasitic torque harmful to the piloting of the spacecraft. To mitigate this problem, deployable structures are dimensioned and reinforced to make them resistant to end-of-travel impacts caused during deployment thereof, but this solution is unsatisfactory and notably increases the overall weight of the structure.

Specific advancements have resulted in the development of deployment mechanisms having near-zero resistive torque. Such mechanisms, such as the hinge line described in patent application FR 2635077, have the advantage of requiring limited motorization power and minimising end-of-travel impacts. Other mechanisms have been developed by improving the aforementioned mechanism, notably in terms of mass and volume. Such a deployment mechanism is disclosed in patent application FR 0605653.

These hinge mechanisms, for the deployment of spatial appendices, nonetheless have different drawbacks that have not been addressed in the prior art.

First of all, the known mechanisms, such as those described in patent applications FR 2635077 and FR 0605653, have a maximum angular deployment capacity of 180°. Furthermore, the overall kinetics thereof generate very irregular motorization torque, on account of the structure thereof. Finally, the deployment speed of known deployment mechanisms, as already mentioned, involves an end-of-travel energy release, and therefore an impact, because said deployment speed is not regulated.

SUMMARY OF THE INVENTION

The invention notably mitigates the aforementioned drawbacks. Thus, to enable deployments at more than 180° using a motorization mechanism that is not over-dimensioned and causes only very minimal end-of-deployment impacts, the present invention provides a motorization system based on the use of two spiral-shaped flexible tracks that are rotatable in relation to one another and arranged such as to generate a torque applied at a contact point between the two flexible tracks.

More specifically, the invention concerns a motorization device comprising two substantially parallel winding cylinders, at least one longitudinal linking element, said linking element being able to maintain a predetermined distance between said winding cylinders, and being wound around said winding cylinders, said linking element consequently having a crossing point located between said winding cylinders, the motorization device also comprising at least two flexible tracks, one flexible track being fixed on each winding cylinder, said flexible tracks being arranged to face one another and having a contact point, a pre-stressing force being applied to said contact point of the flexible tracks under the effect of said linking element; the motorization device according to the invention is characterised in that said flexible tracks are spiral shaped, said spiral shape being arranged such that the contact point between the two spiral-shaped flexible tracks is offset relative to said crossing point of the linking element, said contact point and said crossing point not being aligned on a single axis parallel to the axes of rotation of the winding cylinders, such that a torque dependent on the distance between the contact point and the crossing point is applied to said contact point, said torque being able to cause the reciprocal rotation of the flexible tracks.

Advantageously, the spiral shape is arranged such that the distance between the contact point between the flexible tracks and the crossing point of the linking element is equal to a predetermined value and the elasticity and rigidity of the flexible tracks are configured such as to control said torque exerted on said contact point between the flexible tracks.

In a specific embodiment, said torque is constant.

In another embodiment, said torque is variable.

Advantageously, the linking element may be formed by two flexible winding strips.

Advantageously, the linking element may alternatively be formed by a set of cables.

Advantageously, the motorization device according to the invention may include an end-of-travel stop.

Advantageously, the motorization device according to the invention may include a non-return stop.

Advantageously, the flexible tracks may have a variable cross section.

BRIEF DESCRIPTION OF THE DRAWINGS

Other features and advantages of the invention are disclosed in the description provided below in relation to the drawings attached, which show.

DETAILED DESCRIPTION

FIG. 1 is a diagram of an example of a known Carpentier-joint motorization system, built into a deployment mechanism corresponding to the teaching of patent application FR 0605653. The winding cylinders 1*a*, 1*b* are substantially parallel and held in position by the winding strips 3, or by any other suitable elements, such as cables, wound in a figure of eight around said winding cylinders 1*a*, 1*b*. The partially circular flexible tracks 2*a*, 2*b* are respectively connected to each of the winding cylinders 1*a*, 1*b* and arranged such as to surround each of the cylinders 1*a*, 1*b*. The flexible tracks 2*a*, 2*b* are arranged to face and touch one another. The winding strips 3 induce a pre-stressing force applied to the contact point between the flexible tracks 2*a*, 2*b*. On account of the circular geometry of the winding cylinders 1*a*, 1*b* and the winding tracks 2*a*, 2*b*, the contact point between said flexible tracks and the crossing point of said winding strips 3 are aligned on a parallel equidistant longitudinal axis of the axes of revolution of the two winding cylinders 1*a*, 1*b*. Appendices, such as solar generators GS, are attached to each winding cylinder/flexible track unit 1*a*-2*a*/1*b*-2*b*.

Figure 1A:
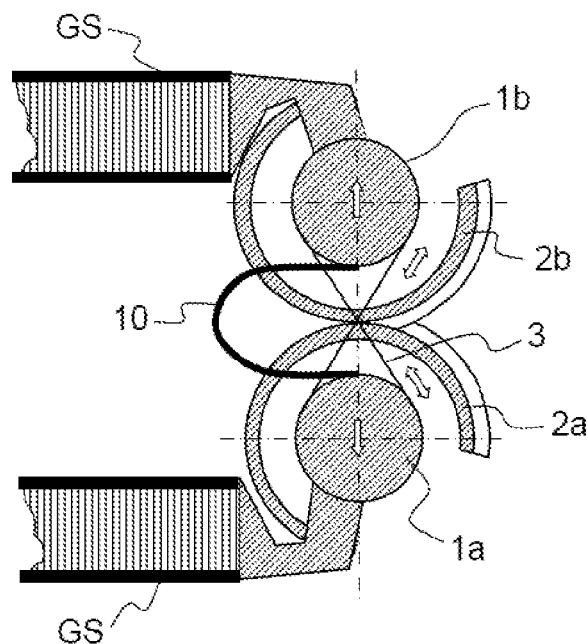
FIG. 1a: a known Carpentier-joint deployment mechanism, in stowed position.
Figure 1B:
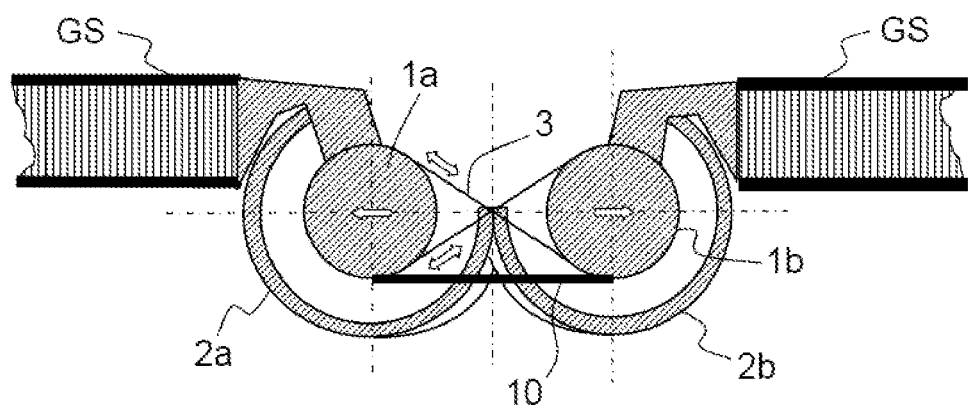
FIG. 1b: a known Carpentier joint deployment mechanism, in deployed position.

As is well known, a Carpentier joint 10 is a thin metal strip having a curved cross section that is used as a motorization spring. Furthermore, a Carpentier joint 10 provides the advantage of maintaining a certain degree of rigidity when open. In FIG. 1*a*, the Carpentier joint 10 is closed and the device is in a stowed position. In FIG. 1*b*, the Carpentier joint 10 is open and the device is in a deployed position.

As mentioned above and shown in FIG. 1*b*, a major drawback of this type of Carpentier-joint motorization is that there is an angular limit to deployment, which cannot exceed 180° on account of the arrangement of said Carpentier joint 10 on the hinge.

Figure 2A:
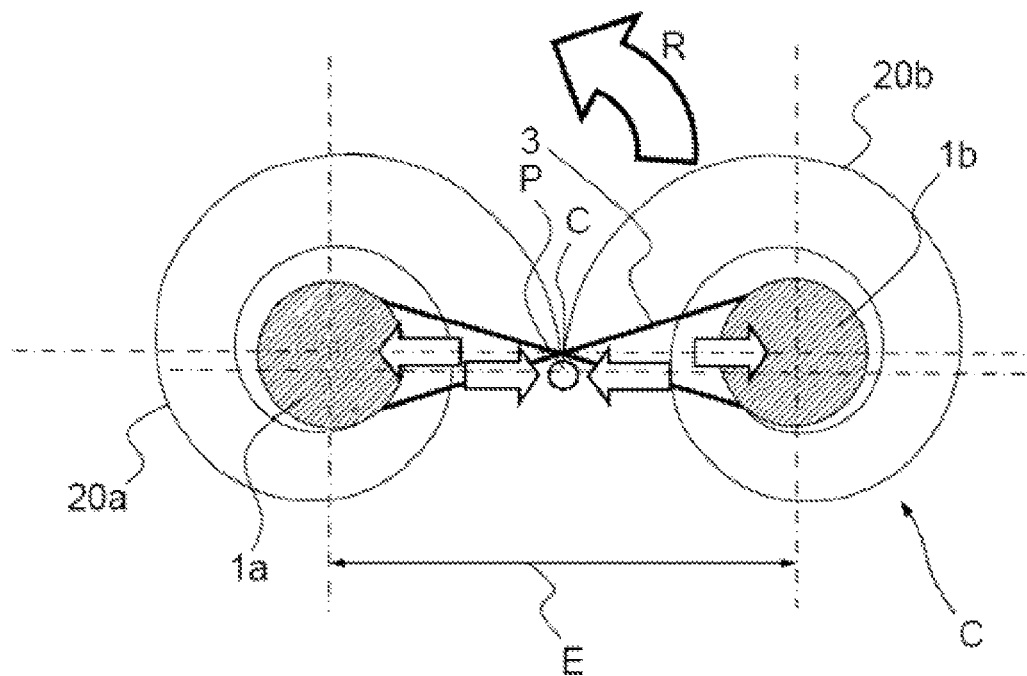
FIGS. 2a and 2b: diagrams of the motorization system according to the invention, in the stowed and deployed positions.
Figure 2B:
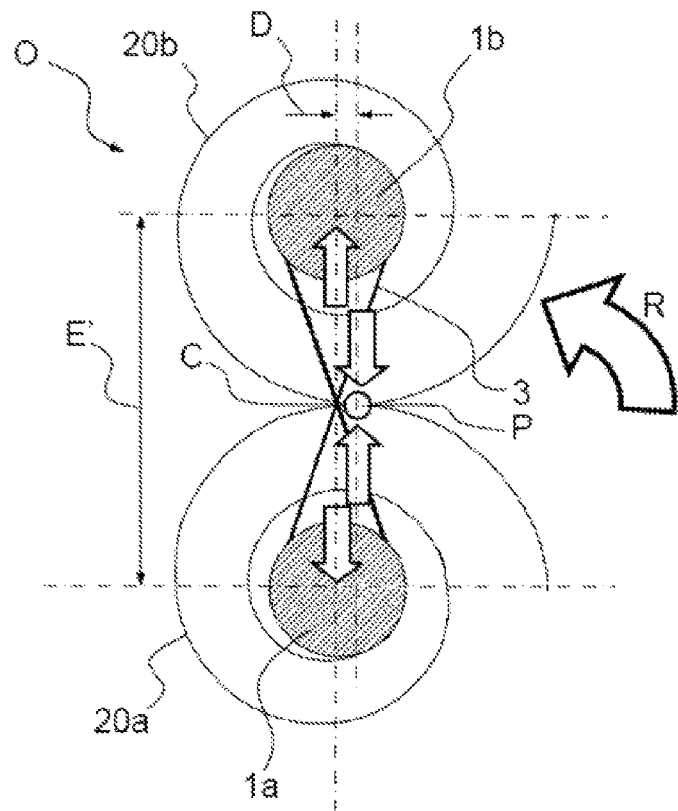

FIGS. 2*a* and 2*b* illustrate the principle of the invention. The architecture of the hinge is similar to that shown in FIGS. 1*a*-1*b*. The flexible tracks 20*a*, 20*b* are respectively connected to each of the winding cylinders 1*a*, 1*b*. The innovative concept of the motorization system for a deployment mechanism according to the invention is based on the flexible tracks 20*a*, 20*b*, which consist of spiral-shaped flexible tracks. In relation to the flexible tracks 2*a*, 2*b* shown in FIGS. 1*a*, 1*b*, the present flexible tracks 20*a*, 20*b* have this specific spiral shape which makes it possible to offset the contact point P between the flexible tracks 20*a*, 20*b* in relation to the crossing point C of the winding strips 3. The contact point P and the crossing point C are not on the same axis parallel to the axes of rotation of the winding cylinders 1*a*, 1*b*. This offsetting by a distance D of the contact point P in relation to the crossing point C offsets the pre-stressing force induced by the winding strips 3 applied to the contact point P. Consequently, a torque R is generated between the contact point P and the crossing point C, inducing the rotation of the flexible tracks 20*a*, 20*b*. The reciprocal rotation of the flexible tracks 20*a*, 20*b*, attributable to the spiral shape thereof, causes a variation in the centre-to-centre distance of the winding cylinders, which changes from E in closed position C to E' in open position O.

Figure 3A:
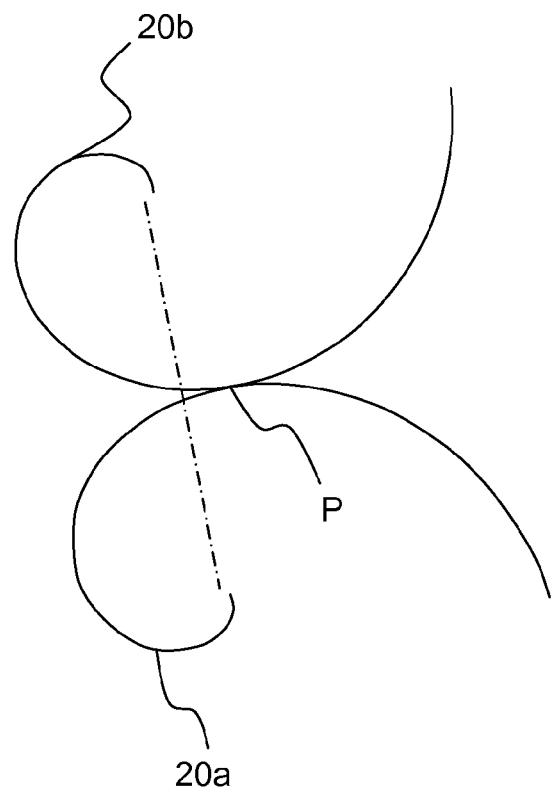
FIGS. 3a and 3b: examples of spiral shapes for the flexible tracks of the motorization system according to the invention.
Figure 3B:
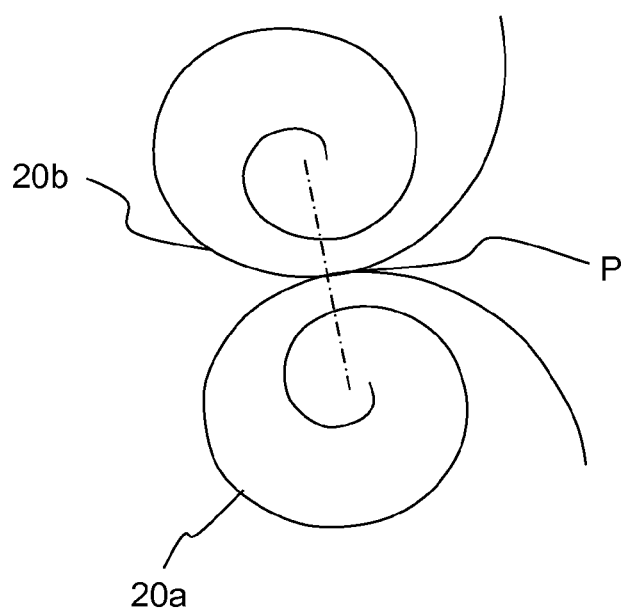
Figure 3C:
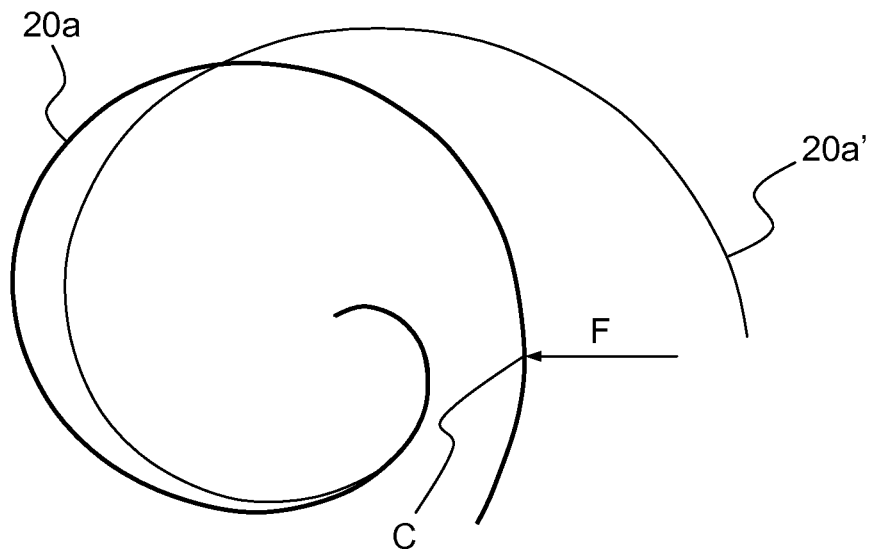
FIGS. 3c and 3d: two diagrams showing a flexible track of the motorization system according to the invention, subjected to different pre-stressing forces.
Figure 3D:
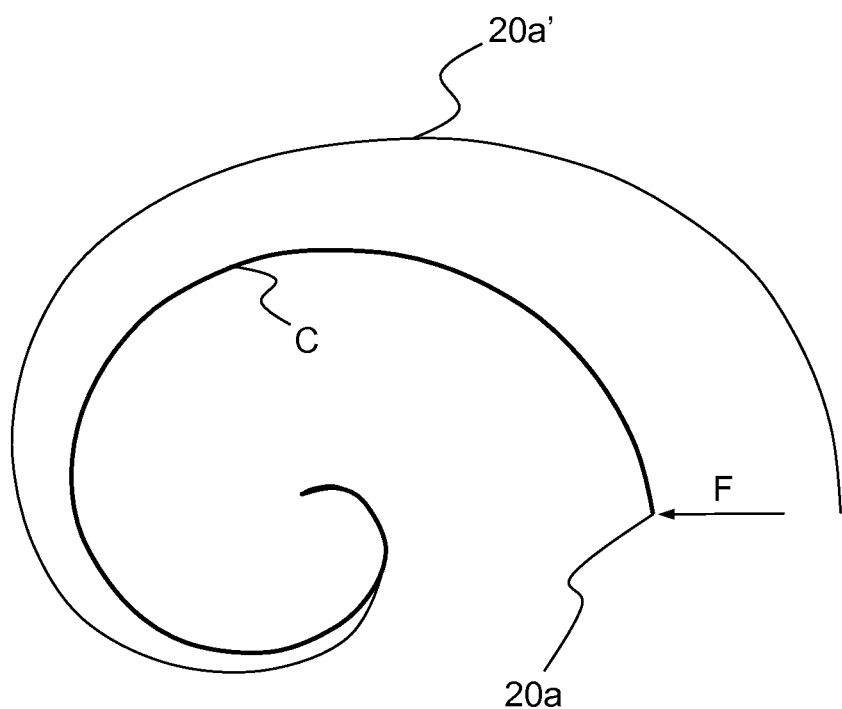

This torque R is configurable as a function of choices made concerning the shape of the spiral and the physical characteristics of the flexible tracks 20*a*, 20*b*, in particular the elasticity and rigidity thereof. To increase the torque R exerted on the flexible tracks, it is possible to increase the offset of the contact point P from the crossing point C by creating a spiral with a large opening angle, as shown in FIG. 3*a*, or to increase the force exerted on the contact point P by creating a stiffer flexible track, as shown in FIG. 3*b*. To increase the force exerted at contact point C, it is also possible to increase the bowing of the flexible tracks 20*a*-20*b*. FIGS. 3*c*-3*d* show the flexible track 20*a* subjected to a pre-stressing force F, flexible track 20*a*' corresponding to flexible track 20*a* not subject to any pre-stressing force. The bowing of the flexible track 20*a* in FIG. 3*c* is greater than in FIG. 3*d*, such that the force applied to the contact point C is greater in the arrangement in FIG. 3*c*.

To generate a constant torque R during the deployment phase, an Archimedean spiral is preferable.

The invention also provides for the possibility of adapting the motorization torque R to compensate for certain variable friction torques introduced by elements outside the hinge. These are typically the strands of electrical cables carrying electricity between two solar generator panels GS. This enables a near-constant motorization margin throughout deployment. Motorisation requirements are then adjusted to what is strictly necessary.

Figure 4:
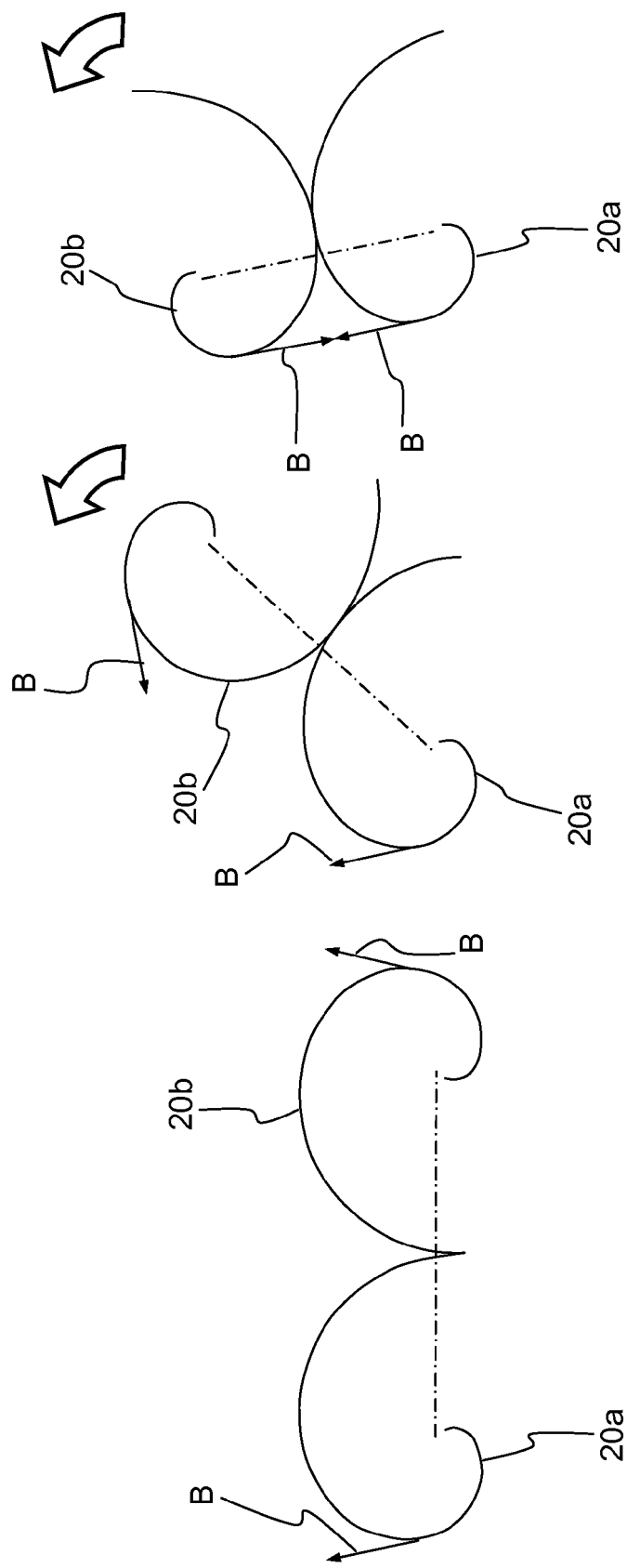
FIG. 4: a motorization system according to the invention, fitted with an end-of-travel stop.

According to an embodiment of the invention, the system comprises an end-of-travel stop B, shown in FIG. 4, that is able to arrest the opening of the system in a suitable position.

Notably, said opening may be greater than 180°.

Figure 5A:
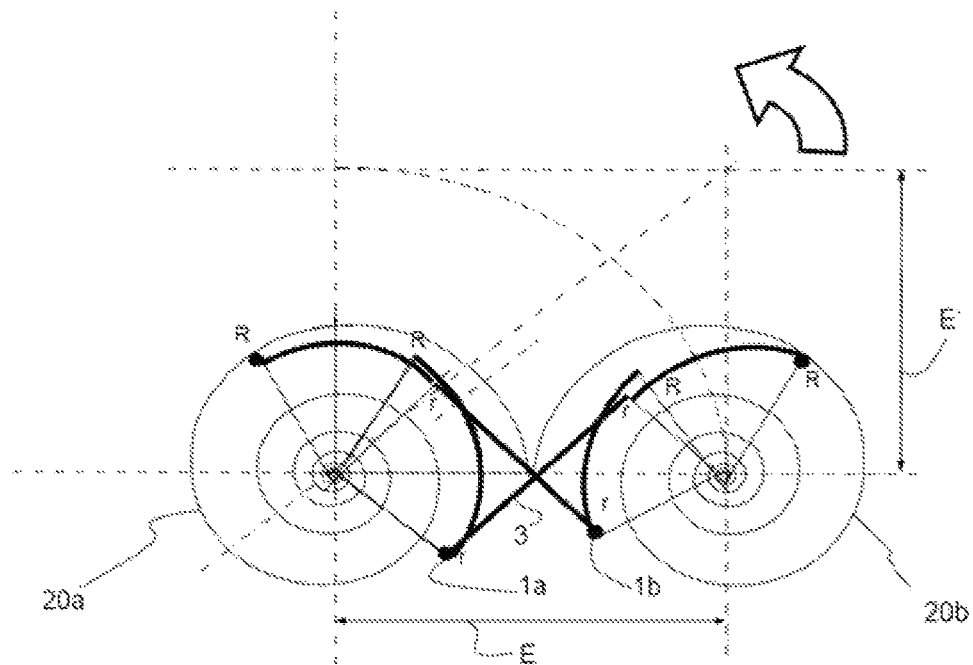
FIGS. 5*a* and 5*b*: two diagrams showing an exemplary implementation of the device according to the invention with variable-profile winding tracks.
Figure 5B:
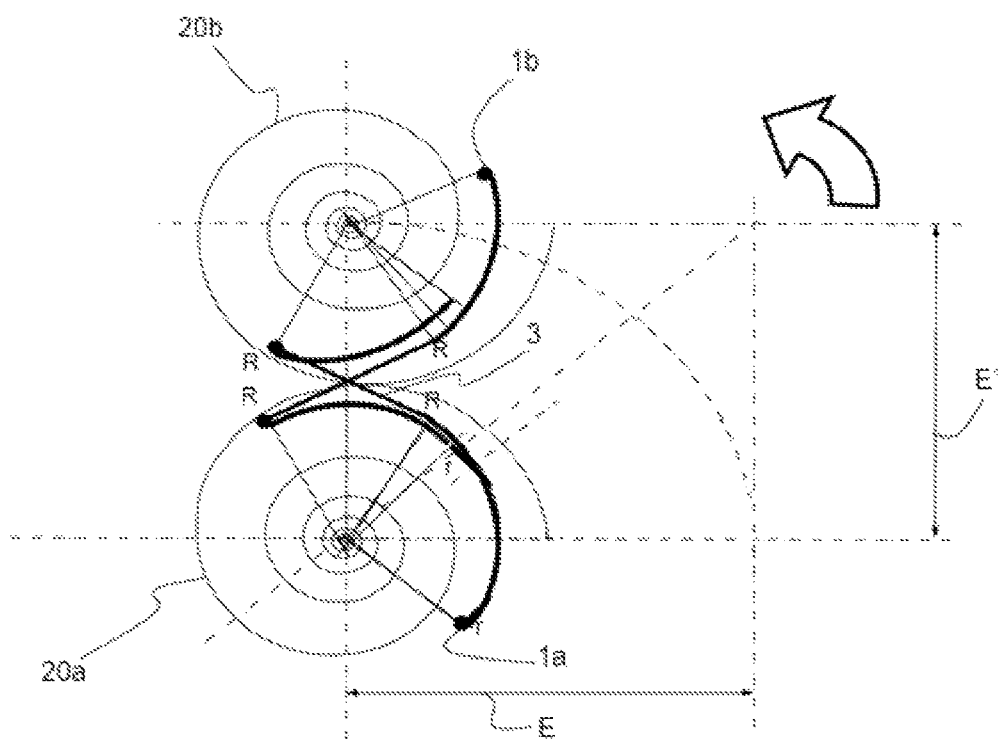

According to a specific embodiment shown in FIGS. 5*a* and 5*b*, a specific system may be provided to compensate for variations in the offset D occurring during opening of the motorization system. Such a compensation system is intended to limit the bowing of the flexible tracks 20*a*-20*b*. Indeed, the winding strips 3 are very rigid along the axis thereof. The use of scalable winding tracks 1*a* and 1*b* enables the flexible tracks 20*a* and 20*b* to be brought closer together during opening of the hinge. The profile of these winding tracks 1*a* and 1*b* is determined as a function of the profile of the spiral shape of the flexible tracks 20*a*-20*b* in order to guarantee the bowing of said flexible tracks 20*a*-20*b*, as well as the torque generated. The winding strips 3 are thus wound onto the small-diameter winding tracks 1*a* and 1*b* in the stowed position, shown as radius r in FIGS. 5*a* and 5*b*, then on to the large-diameter winding tracks 1*a* and 1*b* in the deployed position, shown as radius R in FIGS. 5*a* and 5*b*. This layout makes it possible to reduce the centre-to-centred distance, which changes from E to E', between the two winding tracks 1*a* and 1*b* and the flexible tracks 20*a* and 20*b*.

FIGS. 5*a* and 5*b* thus shows an example of a winding track 1*a* and 1*b* enabling a constant torque to be achieved.

In short, the principal advantage of the invention is proposing an automatic motorization system solution for a deployment mechanism for spatial appendices. The motorization system according to the invention provides an angular capacity that can exceed 180°. Furthermore, the invention makes it possible to control the torque generated in order to open the deployment mechanism. Said generated torque may also be adapted to the motorization strictly required as a function of the resistive torques opposing it. One sample application could be a constant motorization torque.

The system according to the invention also has the advantage of mechanical simplicity, as it comprises few parts, ensuring a certain simplicity of assembly. Finally, the arrangement of the flexible tracks in a spiral shape results in a small contact surface, and therefore minimal friction, which means that the motorization system need not be over-dimensioned and that the risk of end-of-travel impact is reduced.

The invention claimed is:

1. A motorization device, comprising:

two substantially parallel winding cylinders, at least one linking element, the linking element being wound around said winding cylinders in a figure-of-eight shape such that the linking element has a figure-of-eight configuration defining a crossing point located between said winding cylinders, and two spiral-shaped flexible tracks, each one of the two spiral-shaped flexible tracks being fixed on and encircling a respective one of the two substantially parallel winding cylinders, the two spiral-shaped flexible tracks being arranged to face and touch one another at a contact point, a pre-stressing force being applied to the contact point of the flexible tracks under the effect of the linking element, the two spiral-shaped flexible tracks being arranged such that the contact point between the two spiral-shaped flexible tracks forms an axis parallel to axes of rotation of the winding cylinders, the axis of the contact point being offset relative to the crossing point of the linking element such that a torque generated by the pre-stressing force and a distance between the contact point and the crossing point is applied to the contact point, said torque being able to cause rotation of the flexible tracks.

2. The device according to claim 1, wherein the spiral shape is arranged such that the distance between the contact point between the flexible tracks and the crossing point of the linking element is equal to a predetermined value and wherein the elasticity and rigidity of the flexible tracks are configured such as to control said torque exerted on the contact point between the flexible tracks.

3. The device according to claim 1, wherein the two spiral-shaped flexible tracks are configured such that said torque generated is constant.

4. The device according to claim 1, wherein the two spiral-shaped flexible tracks are operable to change a distance between said winding cylinders to vary the torque generated by the pre-stressing force.

5. The device according to claim 1, wherein the linking element comprises two flexible winding strips.

6. The device according to claim 1, wherein the linking element comprises a set of cables.

7. The device according to claim 1, further comprising an end-of-travel stop.

8. The device according to claim 1, wherein the two spiral-shaped flexible tracks each have a variable radius.

9. The device according to claim 3, wherein the two spiral-shaped flexible tracks each include an Archimedean spiral.

10. The device according to claim 1, wherein each one of the two spiral-shaped flexible tracks encircling the respective one of the two substantially parallel winding cylinders revolves at least 360° around the respective one of the two substantially parallel winding cylinders thereof.

11. The device according to claim 1, wherein an angular limit of deployment of the two substantially parallel winding cylinders is greater than 180°.

* * * * *